Sept. 16, 1941.    H. S. AUSHERMAN    2,256,010
RASP BAR FOR GRAIN THRESHING CYLINDERS
Filed March 7, 1940
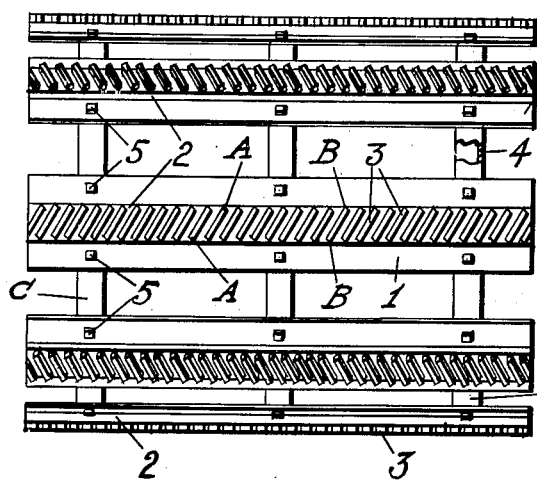
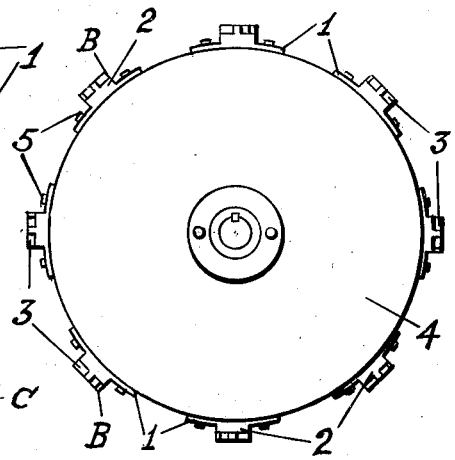
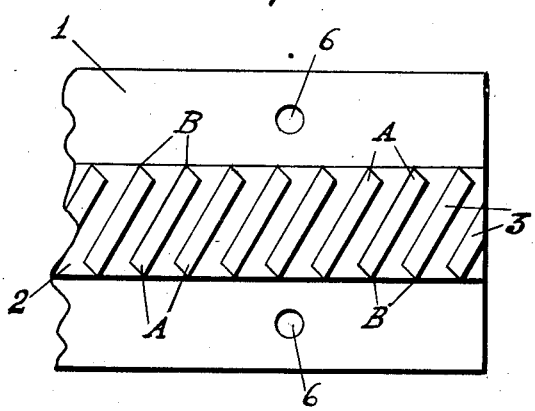
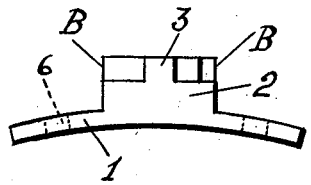
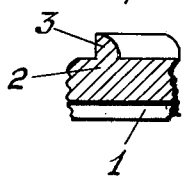
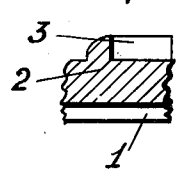
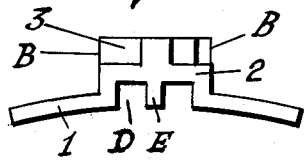
HARRY S. AUSHERMAN
WILLIAM S. AUSHERMAN
INVENTORS.
BY U. G. Charles
ATTORNEY.

Patented Sept. 16, 1941

2,256,010

UNITED STATES PATENT OFFICE 2,256,010

RASP BAR FOR GRAIN THRESHING CYLINDERS

Harry S. Ausherman and William S. Ausherman, Abilene, Kans.

Application March 7, 1940, Serial No. 322,714

1 Claim. (Cl. 130—27)

Our invention relates to improvements in a rasp bar for grain threshing cylinders, and has for its principal object the provision of a reversible bar to renew and extend the time duration of its service.

A further object of our invention is to provide a reversible bar, that the marginal sides thereof are similar so that the tooth elements are positioned centrally of the bar edges, whereby the securing bolts are spaced from the tooth formation, the bar substituting other makes without alteration with respect to securing the bars to the cylinder.

A still further object of our invention is to position a series of teeth obliquely crossing an outward extension intermediate of the marginal side portions of the bar with respect to its width, each side of the extension being substantially at right angle from the body of the bar, whereby the tooth grab is increased, and the arc of the bar conforms to the periphery of the cylinder heads.

A still further object of our invention is to provide a uniform extension of desired width with respect to its outer face and upon which a series of teeth are positioned diagonally thereacross, the terminal end of each tooth terminating with an acute angle to form a point to sever the grain heads or entangled straw, the bar being integral in its structure.

These and other objects will hereinafter be more fully explained, reference being had to the accompanying drawing forming a part thereof.

Referring to the drawing:

Fig. 1 is a side view of a threshing cylinder with the bars mounted thereon.

Fig. 2 is an end view of Fig. 1.

Fig. 3 is an enlarged plan view of an end portion of the bar.

Fig. 4 is an end view of the bar.

Fig. 5 is a fragmentary side view of Fig. 3.

Fig. 6 is an enlarged sectional view through the extension and one tooth, showing one side of the tooth worn by excessive use.

Fig. 7 is a similar view showing the position of the tooth when the bar is reversed to renew its threshing capacity.

Fig. 8 is an end view of the bar modified to reduce the extension in thickness.

Our invention herein disclosed relates to a rasp bar having a body portion 1 and an extension 2 intermediate of the sides of the body portion, the sides of the extension being in parallelism while the outer face thereof is in straight alignment longitudinally and transversely, and having a plurality of teeth 3 diagonally crossing the same and spaced therealong. Each end of the teeth terminate with an acute angle as at A whereby an outwardly extending point B is formed for cutting and threshing efficiency as carried by the rotation of a cylinder.

The said extension, teeth, and body portion are integral and the said body being arced with respect to cross section as shown in Figs. 4 and 8, the arc to conform to the periphery of a cylinder head 4, the bars being spaced thereround as shown in Figs. 1 and 2 and secured by bolts 5 extending through apertures 6 oppositely positioned and being through the marginal portions of the bar, and like apertures in registry therewith that are through the flange C of the head, it being understood that the cylinder heads are of a conventional type and the flanges uniformly apertured to secure different types of bars thereto, some of which have the tooth structure along one edge thereof and through which the apertures extend, mutilating the teeth in contact therewith while in our invention the apertures are oppositely disposed and spaced from the tooth structure whereby the teeth are undisturbed by bolts the entire length of the bar.

To reverse the bar will not change the position of the tooth structure circumferentially, or cause the teeth to rock longitudinally. Inasmuch as the cylinder of a threshing machine rotates continuously in one direction it will be seen that the teeth as diagonally positioned will cause one side thereof to wear away, for example, as shown in Fig. 6, whereby the cutting capacity is lost as the corner is removed. To overcome such deficiency we reverse the bar and in so doing the position of the corners interchange as shown in Fig. 7, reinstating its original capacity and likewise the end of the teeth are subject to the same condition as they interchange at the time of reversing the bar.

In Fig. 8 is shown a modification in connection with the extension in which case the boundary lines of the body and extending portion are in parallelism whereby a depression D is formed and being divided longitudinally by a tongue E, the outer end of which terminates at the arc line of the bar at its underside, by which means a center bearing is provided on the periphery of the head, the bar being so arranged will reduce the weight thereof compared with that shown in Fig. 4, and such other modifications may be made as lie within the scope of the appended claim.

Having fully described our invention what we claim as new and desire to secure by Letters Patent is:

In a rasp bar for grain threshing cylinders, of the class described, comprising an elongated body portion arcuate in cross section, the body portion having an extension integrally joined and equal in length to the body portion and centrally disposed with respect to cross section of the body portion, the outer extremity of the extension being flat, while the edges thereof are in parallelism longitudinally and at right angle to the flat portion and having a plurality of teeth diagonally crossing the straight plane of the extension, integrally joined thereto, and spaced therealong, said teeth each being rectangular in cross section, the terminal ends of which are at right angle outward from the plane of the extension and the said ends obliquely angling inward from their respective edges, and the said bar being reversible to forwardly position either end of the teeth with respect to the direction of rotation of a cylinder, and means in the body portion at each side of the extension to secure the bar to a cylinder as reversed selectively.

HARRY S. AUSHERMAN.
WILLIAM S. AUSHERMAN.